United States Patent
Kaneko

(10) Patent No.: US 11,995,165 B2
(45) Date of Patent: May 28, 2024

(54) UNMANNED FLIGHT DEVICE, MANAGEMENT DEVICE, OPERATION DEVICE AND FLIGHT MANAGEMENT METHOD

(71) Applicant: WORLD SCAN PROJECT, CORP., Tokyo (JP)

(72) Inventor: Kenichi Kaneko, Tokyo (JP)

(73) Assignee: WORLD SCAN PROJECT, CORP., Tokyo (JP)

( * ) Notice: Subject to any disclaimer, the term of this patent is extended or adjusted under 35 U.S.C. 154(b) by 331 days.

(21) Appl. No.: 17/405,032

(22) Filed: Aug. 18, 2021

(65) Prior Publication Data

US 2022/0012319 A1      Jan. 13, 2022

Related U.S. Application Data

(63) Continuation of application No. PCT/JP2020/005803, filed on Feb. 14, 2020.

(30) Foreign Application Priority Data

Feb. 19, 2019   (WO) ............... PCT/JP2019/006083

(51) Int. Cl.
*G06F 21/32*   (2013.01)
*B64C 39/02*   (2023.01)
(Continued)

(52) U.S. Cl.
CPC ............ *G06F 21/32* (2013.01); *B64C 39/024* (2013.01); *G05D 1/101* (2013.01); *B64U 10/13* (2023.01); *B64U 2201/20* (2023.01)

(58) Field of Classification Search
CPC ............ G06F 21/32; G06F 2221/2111; G06F 2221/2113; G06F 2221/2139;
(Continued)

(56) References Cited

U.S. PATENT DOCUMENTS 10,496,087 B2 *  12/2019  Choi .................... G05D 1/0016
11,198,508 B2 *  12/2021  Lee ...................... G08G 5/0069
(Continued)

FOREIGN PATENT DOCUMENTS

JP      H11093478 A      4/1999
JP      2017119501 A     7/2017
(Continued)

*Primary Examiner* — Yonel Beaulieu
(74) *Attorney, Agent, or Firm* — HAUPTMAN HAM, LLP

(57) ABSTRACT

An unmanned flight apparatus that flies on the basis of instruction information acquired from an operation apparatus, the unmanned flight apparatus includes a storage that stores apparatus identification information for identifying the unmanned flight apparatus, an instruction information acquisition part that acquires the instruction information, an authentication processing part that authenticates that the instruction information is proper by comparing registered authentication information stored in a storage medium with biometric information of an operator transmitted periodically from an operation apparatus for operating the unmanned flight apparatus, and a flight controller that flies the unmanned flight apparatus on the basis of the instruction information within an operable range defined by a relationship between the registered authentication information and the apparatus identification information, on a condition that the authentication processing part determines that the instruction information is proper.

14 Claims, 7 Drawing Sheets

(51) Int. Cl.
*G05D 1/00* (2006.01)
*B64U 10/13* (2023.01)

(58) Field of Classification Search
CPC .... B64C 39/024; G05D 1/101; G05D 1/0022; B64U 10/13; B64U 2201/20; G08G 5/0013; G08G 5/0026; G08G 5/0039; G08G 5/0056; G08G 5/006; G08G 5/0069; G08G 5/025; H04W 12/06; H04W 12/63; H04L 63/107; H04L 63/0861; H04L 63/105

See application file for complete search history.

(56) References Cited

U.S. PATENT DOCUMENTS

| | | |
|---|---|---|
| 2012/0022719 A1 | 1/2012 | Matos |
| 2016/0016672 A1 | 1/2016 | Matos |
| 2017/0090484 A1* | 3/2017 | Obaidi ................... B64D 47/08 |
| 2017/0243494 A1 | 8/2017 | Taveira |
| 2017/0357825 A1 | 12/2017 | Takahashi et al. |
| 2018/0107213 A1 | 4/2018 | Kuhara |
| 2018/0141676 A1 | 5/2018 | Suzuki et al. |
| 2018/0222600 A9 | 8/2018 | Matos |
| 2018/0290745 A1 | 10/2018 | Kumada |
| 2019/0176967 A1* | 6/2019 | Ohata ................... B64C 39/024 |
| 2019/0233132 A1 | 8/2019 | Matos |
| 2019/0325763 A1* | 10/2019 | Hux ................... A63F 13/5255 |
| 2021/0139163 A1 | 5/2021 | Matos |
| 2023/0409054 A1* | 12/2023 | Bradley ................. G05D 1/106 |

FOREIGN PATENT DOCUMENTS

| | | |
|---|---|---|
| JP | 2017532237 A | 11/2017 |
| JP | 2017224101 A | 12/2017 |
| JP | 201852474 A | 4/2018 |
| JP | 2018163664 A | 10/2018 |
| WO | 2016171222 A1 | 10/2016 |
| WO | 2017061589 A1 | 4/2017 |
| WO | WO-2018030649 A1 * | 2/2018 ........... B64C 39/024 |
| WO | WO-2018110848 A1 * | 6/2018 ........... B64C 39/024 |

* cited by examiner

| operator ID | apparatus ID | operable range | |
|---|---|---|---|
| 0001 | Y001 | speed | ~20kmh |
| | | altitude | ~50m |
| | | area | B |
| | | photographing | × |
| | X012 | speed | ~40kmh |
| | | altitude | ~70m |
| | | area | C |
| | | photographing | × |
| 0002 | Y001 | speed | ~50kmh |
| | | altitude | ~120m |
| | | area | A |
| | | photographing | ○ |
| | X014 | speed | ~60kmh |
| | | altitude | ~100m |
| | | area | B |
| | | photographing | ○ |
| ... | ... | ... | ... |

FIG. 4

UNMANNED FLIGHT DEVICE, MANAGEMENT DEVICE, OPERATION DEVICE AND FLIGHT MANAGEMENT METHOD

CROSS-REFERENCE TO RELATED APPLICATIONS

The present application is a continuation application of International Application number PCT/JP2020/005803, filed on Feb. 14, 2020, which claims priority under 35 U.S.C § 119(a) to International Application number PCT/JP2019/006083, filed on Feb. 19, 2019. The contents of these applications are incorporated herein by reference in their entirety.

BACKGROUND OF THE INVENTION

The present disclosure relates to an unmanned flight apparatus, a management apparatus for managing the unmanned flight apparatus, an operation apparatus for operating the unmanned flight apparatus, and a flight management method for managing the unmanned flight apparatus.

Japanese Unexamined Patent Application Publication No. 2018-52474 discloses an aircraft control system in which an instruction is transmitted to an unmanned flight apparatus via a network, and the unmanned flight apparatus performs various operations on the basis of the received instruction.

When the unmanned flight apparatus receives an instruction via the network, the apparatus may receive not only an authorized instruction but also an unauthorized instruction. If the unmanned flight apparatus operates on the basis of the unauthorized instruction, the unmanned flight apparatus performs an undesirable operation, which may cause a safety problem.

BRIEF SUMMARY OF THE INVENTION

The present disclosure focuses on these points, and an object of the present disclosure is to improve safety of an unmanned flight apparatus.

An unmanned flight apparatus according to the first aspect of the present disclosure is an unmanned flight apparatus that flies on the basis of instruction information acquired from an operation apparatus, the unmanned flight apparatus includes a storage that stores apparatus identification information for identifying the unmanned flight apparatus, an instruction information acquisition part that acquires the instruction information, an authentication processing part that authenticates that the instruction information is proper by comparing registered authentication information stored in a storage medium with biometric information of an operator transmitted periodically from an operation apparatus for operating the unmanned flight apparatus, and a flight controller that flies the unmanned flight apparatus on the basis of the instruction information within an operable range defined by a relationship between the registered authentication information and the apparatus identification information, on a condition that the authentication processing part determines that the instruction information is proper.

A management apparatus according to the second aspect of the present disclosure is a management apparatus capable of communicating with a plurality of unmanned flight apparatuses, the management apparatus includes a storage that stores a) a plurality of pieces of apparatus identification information for identifying the plurality of unmanned flight apparatuses and b) a plurality of pieces of registered authentication information associated with a plurality of operators or a plurality of operation apparatuses capable of operating at least any one of the plurality of unmanned flight apparatuses, an information receiving part that receives, from the first unmanned flight apparatus, a) first apparatus identification information for identifying a first unmanned flight apparatus, which is one of the plurality of unmanned flight apparatuses, and b) instruction information including biometric information of an operator periodically received by the first unmanned flight apparatus from the operation apparatus in association with each other, an authentication part that generates an authentication result indicating that the instruction information received by the first unmanned flight apparatus is proper information on a condition that the biometric information included in the instruction information is the same as first registered authentication information associated with the first unmanned flight apparatus corresponding to the first apparatus identification information among the plurality of registered authentication information, and an information transmission part that transmits the authentication result to the first unmanned flight apparatus.

A flight management method according to the third aspect of the present disclosure includes the steps of transmitting, to a management apparatus which can communicate with an unmanned flight apparatus, registered authentication information stored in a storage medium of an unmanned flight apparatus in association with apparatus identification information for identifying the unmanned flight apparatus, transmitting, by the management apparatus, an authentication result indicating whether or not the registered authentication information is stored in a storage in association with the apparatus identification information received from the unmanned flight apparatus to the unmanned flight apparatus, acquiring instruction information including a) an instruction for flying the unmanned flight apparatus and b) biometric information of an operator periodically transmitted from an operation apparatus for operating the unmanned flight apparatus, and flying the unmanned flight apparatus, on the basis of the instruction information, within an operable range indicated by the authentication result if the biometric information included in the instruction information is the same as the registered authentication information.

An operation apparatus according to the fourth aspect of the present disclosure is an operation apparatus for operating an unmanned flight apparatus, the operation apparatus includes a biometric information acquisition part that periodically acquires biometric information of an operator operating the operation apparatus, and a transmission part that periodically transmits the biometric information acquired by the biometric information acquisition part to the unmanned flight apparatus that authenticates the operator by comparing registered authentication information stored in a storage medium with the biometric information received from the operation apparatus.

BRIEF DESCRIPTION OF THE DRAWINGS

FIG. 4 is a diagram showing an example of a management database stored in a storage 32.

DETAILED DESCRIPTION OF THE INVENTION

Hereinafter, the present invention will be described through exemplary embodiments of the present invention, but the following exemplary embodiments do not limit the invention according to the claims, and not all of the combinations of features described in the exemplary embodiments are necessarily essential to the solution means of the invention.

[Outline of Flight Apparatus Management System S]

Figure 1:
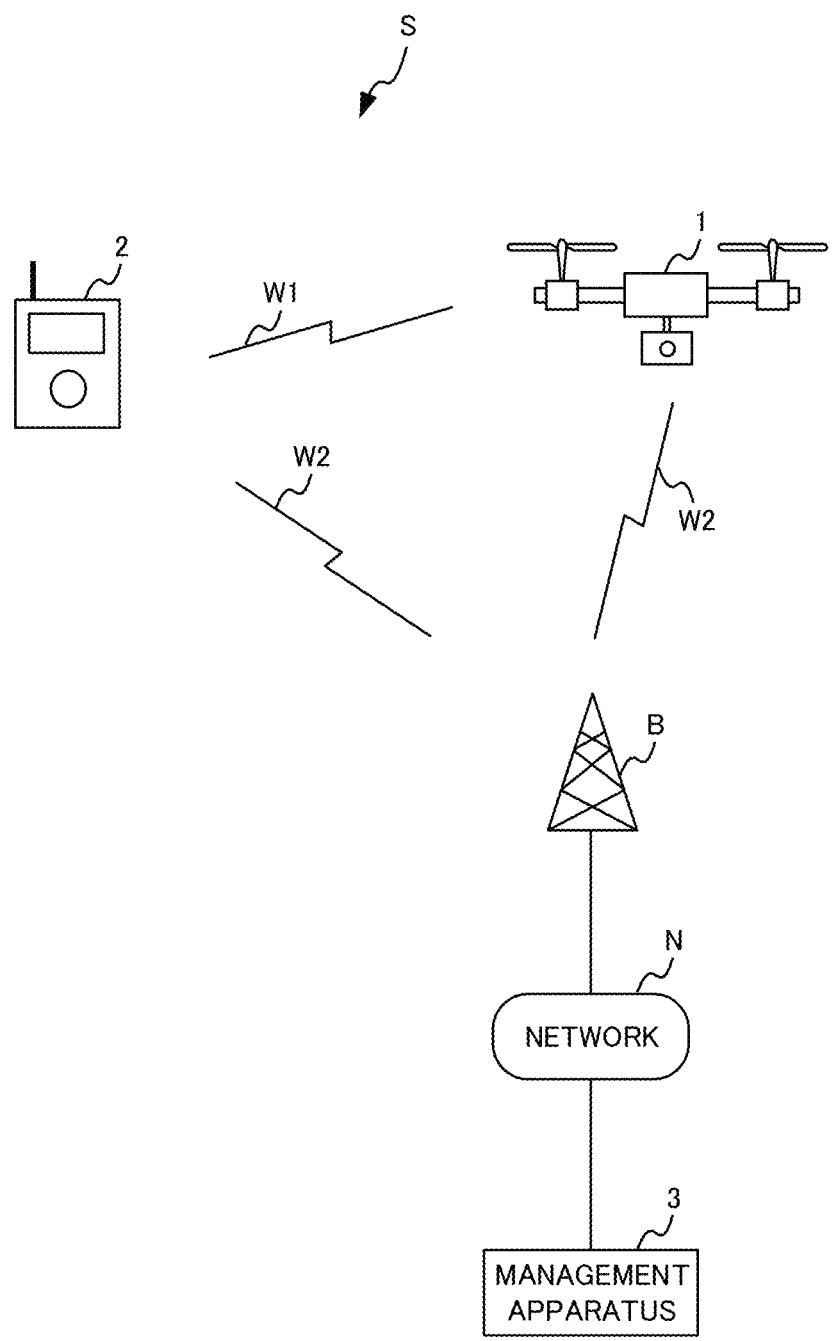
FIG. 1 is a diagram showing an outline of a flight apparatus management system S.

FIG. 1 is a diagram showing an outline of a flight apparatus management system S. The flight apparatus management system S includes an unmanned flight apparatus 1, an operation apparatus 2, and a management apparatus 3. The unmanned flight apparatus 1 is an apparatus that can perform unmanned flight on the basis of instruction information acquired from an external apparatus (for example, the operation apparatus 2 or a computer), and is a drone, for example. The unmanned flight apparatus 1 may fly on the basis of the instruction information received from the operation apparatus 2, or may fly on the basis of the instruction information received from a computer that outputs predetermined instruction information.

The operation apparatus 2 is an apparatus used by an operator to operate the unmanned flight apparatus 1, and includes an operation part (for example, an operation button or an operation joystick), a display part (for example, a display screen), a biometric information acquisition part, and a transmission part. The operation apparatus 2 receives an operation of the operator, and transmits instruction information based on the received operation to the unmanned flight apparatus 1. The biometric information acquisition part periodically acquires biometric information of the operator operating the operation apparatus 2, and notifies the transmission part about the acquired biometric information. The transmission part periodically transmits the provided biometric information to the unmanned flight apparatus 1.

The unmanned flight apparatus 1 and the operation apparatus 2 transmit and receive various types of information via a wireless communication line. The unmanned flight apparatus 1 and the operation apparatus 2 may use a wireless communication line W1 for directly transmitting and receiving information by transmitting and receiving radio waves to and from each other, or may use a second wireless communication line W2 for transmitting and receiving information via a base station B of a mobile phone network.

The management apparatus 3 is a computer that transmits and receives various types of information to and from the unmanned flight apparatus 1 via the base station B and the network N, and functions as, for example, an authentication server that authenticates the instruction information transmitted from the operation apparatus 2 to the unmanned flight apparatus 1. The management apparatus 3 executes various processes for preventing the unmanned flight apparatus 1 from operating abnormally.

Details will be described later, but the management apparatus 3 monitors whether or not it is acceptable to allow the unmanned flight apparatus 1 to perform the operation corresponding to the instruction information on the basis of, for example, the contents of the instruction information received by the unmanned flight apparatus 1. More specifically, the management apparatus 3 monitors a) whether or not the instruction information is transmitted by an operator having authority to operate the unmanned flight apparatus 1, b) whether or not the contents of the operation corresponding to the instruction information are permitted to the operator, and c) whether or not the unmanned flight apparatus 1 is flying in a prohibited area.

The configurations of the unmanned flight apparatus 1 and the management apparatus 3 will be described in detail below.

[Configuration of Unmanned Flight Apparatus 1]

Figure 2:
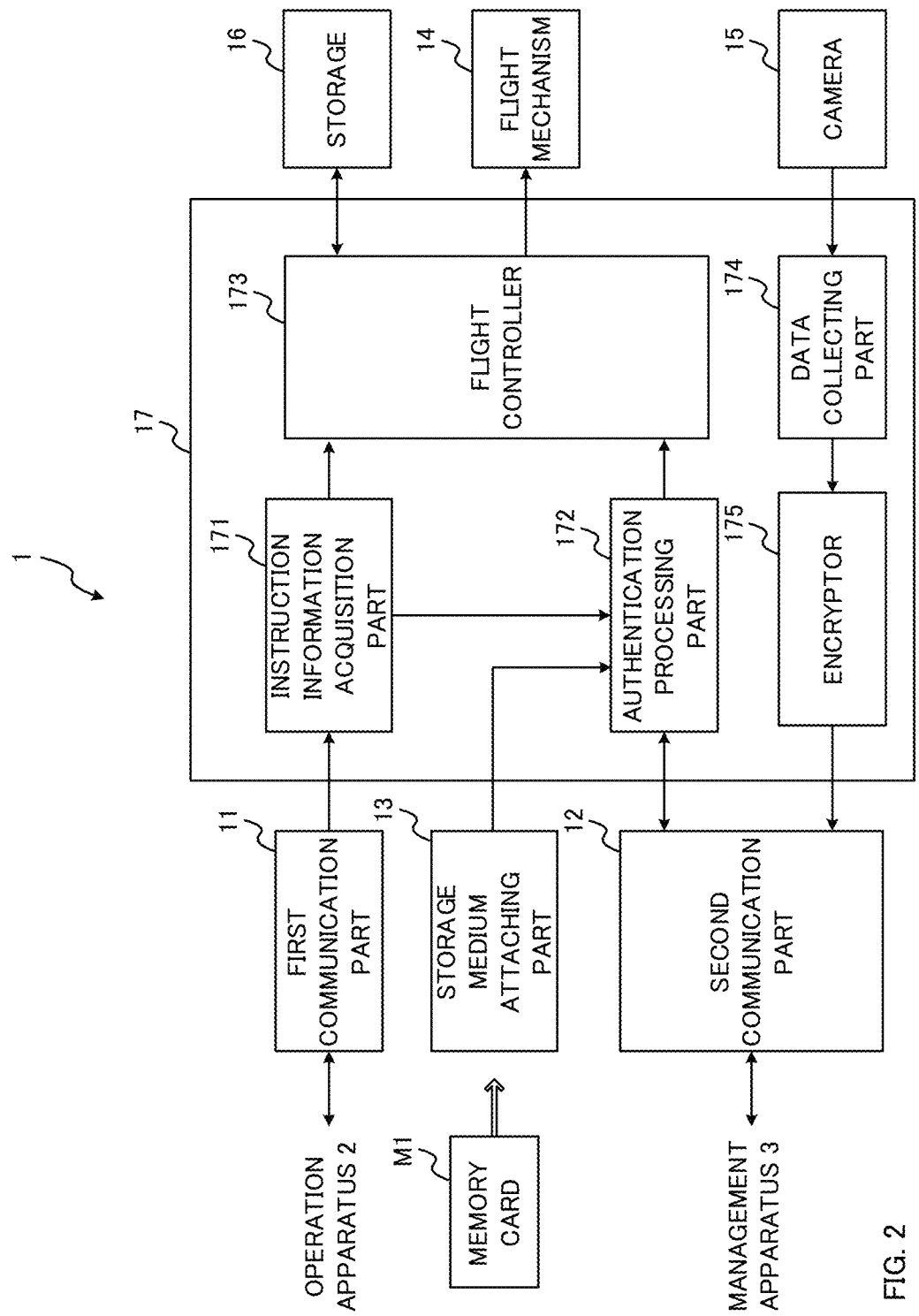
FIG. 2 is a diagram showing a configuration of an unmanned flight apparatus 1.

FIG. 2 is a diagram showing a configuration of the unmanned flight apparatus 1. The unmanned flight apparatus 1 includes a first communication part 11, a second communication part 12, a storage medium attaching part 13, a flight mechanism 14, a camera 15, a storage 16, and a controller 17. The controller 17 includes an instruction information acquisition part 171, an authentication processing part 172, a flight controller 173, a data collecting part 174, and an encryptor 175.

The first communication part 11 is a communication interface for transmitting and receiving information to and from the operation apparatus 2. The first communication part 11 includes, for example, a wireless communication controller for communicating with the operation apparatus 2 via the first wireless communication line W1. The first communication part 11 notifies the instruction information acquisition part 171 about the instruction information received from the operation apparatus 2.

The second communication part 12 is a communication interface for transmitting and receiving information to and from the management apparatus 3 via the base station B and the network N. The second communication part 12 includes, for example, a wireless communication controller for communicating with the management apparatus 3 via the second wireless communication line W2. The second communication part 12 transmits, to the management apparatus 3, information necessary for authenticating by determining whether or not the instruction information received from the operation apparatus 2 is proper information, and receives an authentication result from the management apparatus 3. The storage medium attaching part 13 notifies the authentication processing part 172 of the authentication result received from the management apparatus 3.

The storage medium attaching part 13 is an interface for attaching a storage medium M1 (e.g. memory card M1). The storage medium M1 can be any storage medium with non-volatile memory that can store data. The storage medium M1 may be a Subscriber Identity Module (SIM) card provided by a telecommunication carrier that provides the second wireless communication line W2.

The storage medium M1 stores registered authentication information, for example. The registered authentication information is information given to an operator permitted to fly the unmanned flight apparatus 1, and is information such as a) operator identification information for identifying the operator, b) a password associated with the operator identification information, or c) information that is generated by encrypting the operator identification information or password. The registered authentication information may be text information or biometric information of the operator.

In the following description, the operator identification information is used as the registered authentication information, and the registered authentication information may be referred to as a "registered operator ID." In the flight apparatus management system S according to the present embodiment, the operator who operates the unmanned flight apparatus 1 using the operation apparatus 2 can operate the unmanned flight apparatus 1 by attaching the storage medium M1 storing his/her own registered operator ID to the storage medium attaching part 13.

It should be noted that the operator may allow the operation apparatus 2 to transmit the registered operator ID or password to the unmanned flight apparatus 1 by a) attaching the storage medium M2 storing his/her own registered operator ID also to the operation apparatus 2 or b) inputting his/her own registered operator ID, password, or the like into the operation apparatus 2. Further, the biometric information acquisition part of the operation apparatus 2 may periodically (that is, at every predetermined time interval) acquire the biometric information of the operator, and the transmission part may periodically transmit instruction information including the acquired biometric information to the unmanned flight apparatus 1.

The biometric information is a fingerprint pattern, a vein pattern, a color and a shape of a pupil, an image of a face, information stored in an integrated circuit embedded in a body, or voice, for example. The unmanned flight apparatus 1 flies on the basis of the instruction information received from the operation apparatus 2 on a condition that the received biometric information matches the registered authentication information stored in advance in the storage medium M1. If the received biometric information does not match the registered authentication information stored in advance in the storage medium M1, the unmanned flight apparatus 1 returns to, for example, a preset position (for example, a base).

The transmission part of the operation apparatus 2 may determine a time interval with which the biometric information is transmitted to the unmanned flight apparatus 1 on the basis of the position at which the unmanned flight apparatus 1 is flying. For example, when the unmanned flight apparatus 1 is flying at a position where a first security level is assigned, the operation apparatus 2 shortens the time interval with which the biometric information is transmitted as compared with the case where the unmanned flight apparatus 1 is flying at a position where a second security level lower than the first security level is assigned. The operation apparatus 2 controls the time interval by referring to, for example, the position information transmitted by the unmanned flight apparatus 1 and the data in which the position and the security level are associated with each other. By having the operation apparatus 2 operating in this manner, the risk that an operator other than the registered operator flies the unmanned flight apparatus 1 in an area with a high security level can be reduced.

The authentication processing part 172 of the unmanned flight apparatus 1 may determine a time interval with which the operation apparatus 2 transmits the biometric information to the unmanned flight apparatus 1 on the basis of the position at which the unmanned flight apparatus 1 is flying, and may inform the operation apparatus 2 about the determined time interval. For example, when the unmanned flight apparatus 1 is flying at a position where the first security level is assigned, the authentication processing part 172 shortens the time interval with which the operation apparatus 2 transmits the biometric information as compared with the case where the unmanned flight apparatus 1 is flying at a position where the second security level lower than the first security level is assigned. The authentication processing part 172 controls the time interval by referring to, for example, data in which the position of the unmanned flight apparatus 1 and the security level are associated with each other. By the authentication processing part 172 operating in this manner, the risk that an operator other than the registered operator flies the unmanned flight apparatus 1 in an area with a high security level can be reduced.

The flight mechanism 14 includes a mechanism such as a motor and a propeller required for flying the unmanned flight apparatus 1. The flight mechanism 14 operates each mechanism to fly the unmanned flight apparatus 1 at a speed, a direction, and an altitude determined on the basis of control data inputted by the flight controller 173.

The camera 15 generates a photographic image by photographing an area around the unmanned flight apparatus 1. The camera 15 inputs the generated photographic image to the data collecting part 174.

The storage 16 includes a storage medium such as a Read Only Memory (ROM), a Random Access Memory (RAM), or a hard disk. The storage 16 stores a program executed by the controller 17. Further, the non-volatile memory (for example, ROM) of the storage 16 stores apparatus identification information (hereinafter referred to as "apparatus ID") for identifying the unmanned flight apparatus 1. The storage 16 may temporarily store the photographic image generated by the camera 15.

The controller 17 includes a Central Processing part (CPU), for example. The controller 17 functions as the instruction information acquisition part 171, the authentication processing part 172, the flight controller 173, the data collecting part 174, and the encryptor 175 by executing the program stored in the storage 16. The controller 17 may be formed of a circuit other than the CPU.

The instruction information acquisition part 171 acquires the instruction information transmitted by the operation apparatus 2 via the first communication part 11. The instruction information is numerical information or text information for designating a speed, a direction, and an altitude at which the unmanned flight apparatus 1 will fly. The instruction information includes the authentication information used for determining whether or not the instruction information is proper information. The authentication information is, for example, an operator ID, a password, or biometric information, which is information for identifying the operator. The instruction information acquisition part 171 notifies the authentication processing part 172 and the flight controller 173 about the acquired instruction information.

The authentication processing part 172 acquires the registered operator ID stored in the storage medium M1, and uses the acquired registered operator ID to authenticate that the instruction information acquired by the instruction information acquisition part 171 is proper. The "instruction information is proper" means that the instruction information is transmitted in response to an operation of an operator having the authority to operate the unmanned flight apparatus 1. If the instruction information is not proper, it means, for example, that the instruction information has been sent to the unmanned flight apparatus 1 in an unauthorized manner by a person who does not have the authority to operate the unmanned flight apparatus through hacking.

For example, if the authentication information (for example, operator ID) included in the instruction information is the same as the registered operator ID stored in the storage medium M1, or if the authentication information (for example, password or biometric information) included in the instruction information corresponds to the registered operator ID, the authentication processing part 172 determines that the instruction information is proper. The "case where the authentication information included in the instruction information corresponds to the registered authentication information" includes, for example, a) a case where the authentication information included in the instruction information includes the registered authentication information and b) a case where the authentication information included in the instruction information is the same as the information after a conversion of the registered authentication information according to a predetermined rule.

The authentication processing part 172 transmits the instruction information acquired from the operation apparatus 2 by the instruction information acquisition part 171, the apparatus ID, and the registered operator ID in association with each other to the management apparatus 3, and receives a result of the authentication made by the management apparatus 3. Details of authentication processing in the management apparatus 3 will be described later, but the management apparatus 3 transmits the authentication result indicating that the instruction information is proper information to the unmanned flight apparatus 1 on a condition that the operator ID as the authentication information included in the instruction information is the same as the registered operator ID or that the password or the biometric information as the authentication information corresponds to the registered operator ID. The authentication processing part 172 notifies the flight controller 173 of the authentication result received from the management apparatus 3.

Before having the flight controller 173 start the operation based on the instruction information, the authentication processing part 172 may determine whether or not to operate the flight controller 173 on the basis of the relationship between the registered operator ID and the apparatus ID. For example, after the unmanned flight apparatus 1 is turned on, the authentication processing part 172 authenticates that the operator corresponding to the registered operator ID is authorized to operate the unmanned flight apparatus 1. The authentication processing part 172 transmits the apparatus ID and the registered operator ID to the management apparatus 3 in association with each other after, for example, the unmanned flight apparatus 1 is turned on, and determines whether or not the operator may operate the unmanned flight apparatus 1 on the basis of the authentication result received from the management apparatus 3.

If it is determined that the operator may operate the unmanned flight apparatus 1, the authentication processing part 172 notifies the flight controller 173 that the operation is permitted, and if it is determined that the operator must not operate the unmanned flight apparatus 1, the authentication processing part 172 notifies the flight controller 173 that the operation is prohibited. If the authentication processing part 172 determines that the operator must not operate the unmanned flight apparatus 1, the flight controller 173 controls the power supply of the unmanned flight apparatus 1 such that the power supply is turned off, for example.

The authentication processing part 172 may execute the authentication processing at the predetermined time interval instead of executing the authentication processing every time the instruction information is received. By having the authentication processing part 172 operating in this manner, the influence of a delay in operation caused by executing the authentication processing can be reduced.

In addition, the authentication processing part 172 may execute the authentication processing when the authentication processing part 172 receives the instruction information for performing an operation not included in an operable range defined by the relationship between the registered operator ID and the apparatus ID. The operable range includes, for example, a) an operation condition range such as a maximum speed, a maximum acceleration, or a maximum altitude in which the unmanned flight apparatus 1 is allowed to fly, b) a range of area where the unmanned flight apparatus 1 is allowed to fly, and c) a range of functions in which the unmanned flight apparatus 1 is allowed to perform. By having the authentication processing part 172 operating in this manner, the unmanned flight apparatus 1 can be prevented from performing an inappropriate operation while preventing a delay in operation from occurring due to the authentication processing.

The flight controller 173 controls the flight mechanism 14 to fly the unmanned flight apparatus 1. Under the condition that the authentication processing part 172 determines that the instruction information acquired by the instruction information acquisition part 171 is proper, the flight controller 173 flies, on the basis of the instruction information, the unmanned flight apparatus 1 within the operable range determined by the relationship between the registered operator ID and the apparatus ID.

For example, the flight controller 173 controls the flight mechanism 14 on the basis of the instruction information after the authentication processing part 172 transmits the registered operator ID and the apparatus ID in association with each other to the management apparatus 3 and receives the authentication result from the management apparatus 3. The authentication result includes operation condition information indicating the operation condition range. The operation condition range is, for example, a range equal to or less than the maximum speed, acceleration, or altitude allowed when the unmanned flight apparatus 1 flies. The operation condition information is determined, for example, for each registered operator ID, apparatus ID, or combination of the registered operator ID and the apparatus ID.

For example, the flight controller 173 flies the unmanned flight apparatus 1 within the operation condition range determined on the basis of the authentication result received from the management apparatus 3 in response to the authentication processing part 172 transmitting the apparatus ID and the registered operator ID in association with each other to the management apparatus 3. Specifically, the flight controller 173 flies the unmanned flight apparatus 1 within the range of the speed, acceleration, or altitude indicated by the operation condition information, on the basis of the instruction information.

In some cases, depending on the operator, it may be desirable to change the area in which the unmanned flight apparatus 1 is allowed to be flown. For example, a highly-skilled operator has a low risk of causing a problem when flying the unmanned flight apparatus 1 over an area where people are present, but it is dangerous for a less-skilled operator to fly the unmanned flight apparatus 1 over an area where people are present. Further, depending on the weight or size of the unmanned flight apparatus 1, the area in which the unmanned flight apparatus 1 is allowed to be flown may differ. Depending on the combination of the operator and specifications of the unmanned flight apparatus 1, the area in which the unmanned flight apparatus 1 is allowed to fly may differ.

Thus, the authentication result may include flight range information indicating an allowed flight range of the unmanned flight apparatus 1. The flight range information includes position information such as latitude/longitude information, altitude information, and the like indicating a boundary of a range in which the unmanned flight apparatus 1 is allowed to fly. The flight range information is determined, for example, for each registered operator ID, apparatus ID, or combination of the registered operator ID and the apparatus ID.

The flight controller 173 flies the unmanned flight apparatus 1 such that the flight position of the unmanned flight apparatus 1 is included in the allowed flight range indicated by the flight range information. The flight controller 173 may transmit a message to an external apparatus when it is determined that the unmanned flight apparatus 1 will reach a position not included in the allowed flight range of the unmanned flight apparatus 1 if the unmanned flight apparatus 1 continues its flight based on the instruction information. The external apparatus is, for example, the operation apparatus 2 or a computer of an administrator of the unmanned flight apparatus 1.

In addition, it may be desirable to make the operation allowed to be performed using the unmanned flight apparatus 1 different depending on the operator. For example, there is a case where press personnel who have been given permission in advance or a person who has paid a predetermined fee is permitted to photograph an event venue from above for the purpose of news reporting, and photography by anyone other than these people is prohibited. In such a case, the authentication result may include function range information indicating the range of functions that are allowed to be performed by the unmanned flight apparatus 1. The function range information is, for example, information indicating which functions are permitted to be performed by the unmanned flight apparatus 1 among a plurality of functions such as a function of photographing, a function of gripping an object, a function of discharging a liquid, and a function of radiating light or infrared rays.

The function range information is determined, for example, for each registered operator ID, apparatus ID, or combination of the registered operator ID and the apparatus ID. The flight controller 173 performs the permitted function included in the range indicated by the function range information, and does not perform the non-permitted functions not included in the range indicated by the function range information.

Since the flight controller 173 does not perform an operation outside the operable range determined on the basis of the operation condition information, the flight range information, or the function range information as described above, the unmanned flight apparatus 1 can be prevented from flying for the purpose of performing an inappropriate action such as destroying a building or obtaining information illegally.

If the flight controller 173 determines that the operator ID serving as the authentication information included in the instruction information acquired by the instruction information acquisition part 171 is not the same as the registered operator ID, the flight controller 173 may transmit data indicating that an unauthorized instruction has been received to the external apparatus. When the instruction information acquisition part 171 acquires the instruction information for instructing an operation exceeding the operable range defined by the relationship between the registered operator ID and the apparatus ID, the flight controller 173 may transmit the data indicating that an unauthorized instruction has been received to the external apparatus. The external apparatus is, for example, the operation apparatus 2 or the computer of the administrator of the unmanned flight apparatus 1.

Due to the operator or the administrator of the unmanned flight apparatus 1 being notified that the unauthorized instruction has been received in this way, the operator or the administrator of the unmanned flight apparatus 1 can find that the unmanned flight apparatus 1 has been taken over by a third party. Therefore, the operator or the administrator of the unmanned flight apparatus 1 can remotely control the unmanned flight apparatus 1 to discontinue its flight to prevent the unmanned flight apparatus 1 from performing a dangerous operation.

The flight controller 173 may perform a predetermined operation for preventing the unmanned flight apparatus 1 from performing the dangerous operation in addition to or instead of transmitting the data indicating that an unauthorized instruction has been received to the external apparatus. The predetermined operation is, for example, an operation of landing the unmanned flight apparatus 1 at the nearest safe location, an operation of decreasing the flight speed, or an operation of shutting off the power source after landing. By having the flight controller 173 operating in this manner, the unmanned flight apparatus 1 can be prevented from performing dangerous operations.

The data collecting part 174 collects data during the flight of the unmanned flight apparatus 1. The data collected by the data collecting part 174 is, for example, photographic data obtained by photographing the area around the unmanned flight apparatus 1, or weather data indicating the weather condition around the unmanned flight apparatus 1. The data collecting part 174 inputs the collected data to the encryptor 175.

The data collecting part 174 may transmit the collected data to a predetermined server while the biometric information received from the operation apparatus 2 matches the registered authentication information or while the biometric information has a predetermined correlation with the registered authentication information, and does not need to transmit the collected data to the predetermined server while the biometric information received from the operation apparatus 2 does not match the registered authentication information. This collected data includes, for example, date and time information, information indicating a flight position, information of an operator, and the like. The data collecting part 174 may transmit these pieces of information at the timing when the biometric information that matches the registered authentication information is received. When the time interval with which the operation apparatus 2 transmits the biometric information is shortened while the unmanned flight apparatus 1 is flying in an area where a high security level is assigned, the unmanned flight apparatus 1 can transmit the data at shorter time intervals while the unmanned flight apparatus 1 is flying in the area where the high security level is assigned as compared with a case where the unmanned flight apparatus 1 is flying in an area where a low security level is assigned.

The encryptor 175 encrypts the data collected by the data collecting part 174 using a private key stored in the storage medium M1 to create encrypted data. The private key is assigned to, for example, the operator corresponding to the registered operator ID stored in the storage medium M1, and is used for preventing a third party other than the operator from accessing the data collected by the data collecting part 174.

The encryptor 175 stores generated encrypted data in the storage medium M1, or transmits the encrypted data to an external computer via the second communication part 12. The encryptor 175 may transmit the encrypted data to blockchain. By having the encrypted data transmitted to the blockchain, the encrypted data can be stored without being tampered with by a third party.

[Configuration of Management Apparatus 3]

Figure 3:
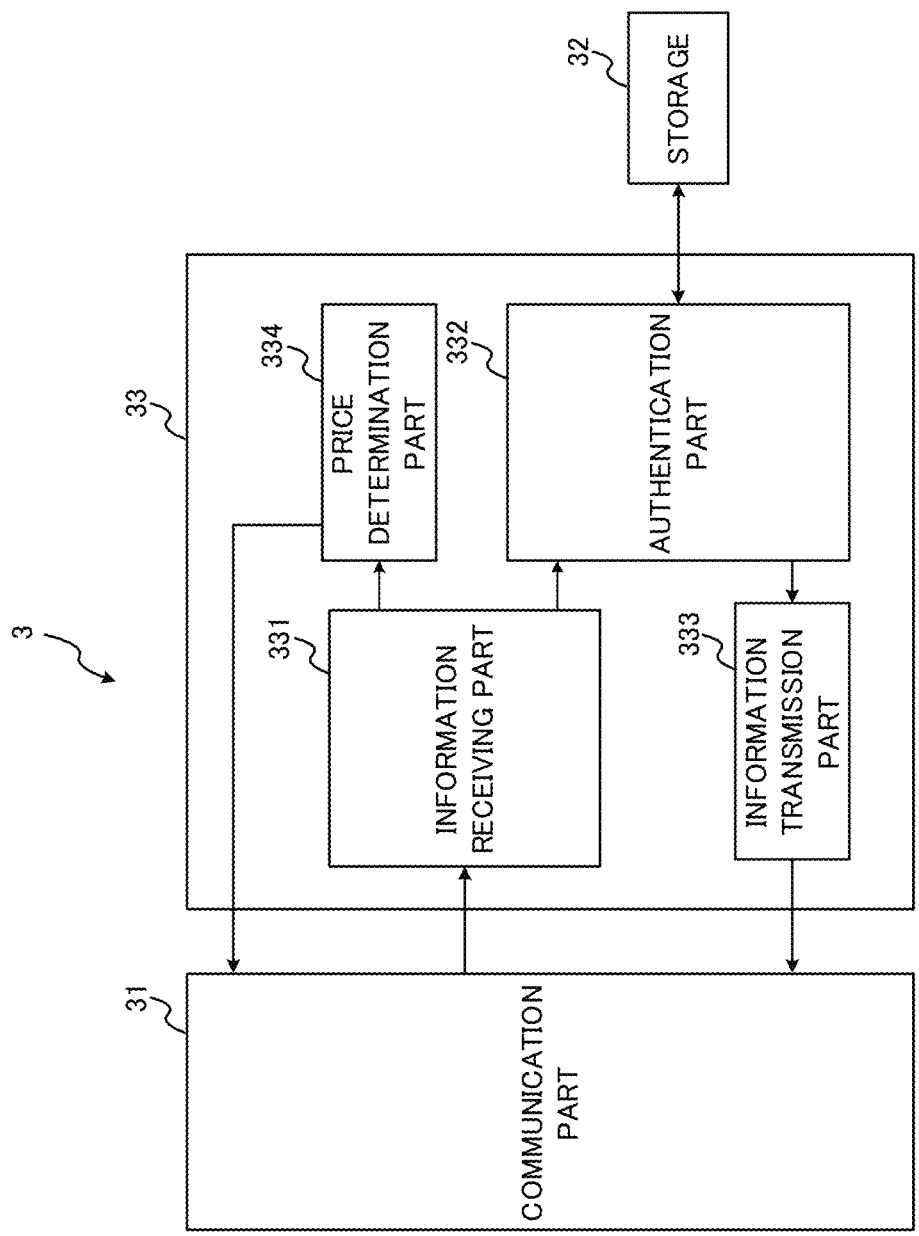
FIG. 3 is a diagram showing a configuration of a management apparatus 3.

FIG. 3 is a diagram showing a configuration of the management apparatus 3. The management apparatus 3 includes a communication part 31, a storage 32, and a controller 33. The controller 33 includes an information receiving part 331, an authentication part 332, an information transmission part 333, and a price determination part 334.

The communication part 31 is a communication interface for transmitting and receiving various types of information to and from the unmanned flight apparatus 1, the operation apparatus 2, or other computers. The communication part 31 includes, for example, a LAN (Local Area Network) controller for accessing the network N. The communication part 31 receives the information such as the apparatus ID and the registered operator ID from the unmanned flight apparatus 1, and notifies the information receiving part 331 about the received information. The communication part 31 transmits the authentication result inputted from the information transmission part 333 to the unmanned flight apparatus 1. Further, the communication part 31 transmits information indicating a price inputted from the price determination part 334 to the operation apparatus 2 or an external computer.

The storage 32 includes a storage medium such as a ROM, a RAM, and a hard disk. The storage 32 stores a) a plurality of apparatus IDs for identifying a plurality of unmanned flight apparatuses 1 and b) a plurality of registered operator IDs associated with a plurality of operators or a plurality of operation apparatuses 2 capable of operating at least any one of the plurality of unmanned flight apparatuses 1. The apparatus ID may be information unique to the unmanned flight apparatus 1 or information common to the unmanned flight apparatuses 1 having the same model name.

The storage 32 stores the operation range information indicating the operable range of the unmanned flight apparatus 1 in association with each of the plurality of registered operator IDs. The storage 32 stores a management database in which the registered operator ID, the apparatus ID, and the operable range are associated with each other, for example.

FIG. 4 is a diagram showing an example of the management database stored in the storage 32. In the management database shown in FIG. 4, the registered operator ID, the apparatus ID, and the operation range information are associated with each other. The operation range information is information indicating a range of operation in which the operator corresponding to the registered operator ID is allowed to make the unmanned flight apparatus 1 corresponding to the apparatus ID associated with the registered operator ID perform. Although the apparatus ID in FIG. 4 indicates the model name of the unmanned flight apparatus 1, the apparatus ID may be identification information different for each unmanned flight apparatus 1.

The management database shown in FIG. 4 includes information indicating, as the operation range information indicating the operable range, a) the maximum speed, the maximum altitude, and the area at which the operator is allowed to fly the unmanned flight apparatus 1 and b) whether or not photography is possible. Since the operator with the registered operator ID of 0002 is more skilled than the operator with the registered operator ID of 0001, a case is assumed in which the operator with the registered operator ID of 0002 can fly the unmanned flight apparatus 1 at a greater speed and to a greater altitude.

Each of "A," "B," and "C" indicating an area is information that indicates latitude/longitude included in an area in which the unmanned flight apparatus 1 is allowed to fly, and includes, for example, latitude/longitude information of a boundary line of the area. In the example shown in FIG. 4, the sizes of the areas are set in the order of area A>area B>area C. The area A may correspond to an area where a highly-skilled person is allowed to fly the unmanned flight apparatus 1, and the area C may correspond to an area where a low-skilled person is allowed fly the unmanned flight apparatus 1.

In the "photographing function," "X" indicates that it is not permitted to perform the function of photographing the area around the unmanned flight apparatus 1 while the operator is flying the unmanned flight apparatus 1, and "O" indicates that it is permitted to perform the function of photographing. These pieces of information included in the management database can be preset or updated by the administrator of the unmanned flight apparatus 1. The administrator of the unmanned flight apparatus 1 updates the information specifying the operable range when, for example, the operator has undergone predetermined training or obtained a license of a high rank.

Referring back to FIG. 3, the controller 33 will be described in detail. The controller 33 includes a CPU, for example, and functions as the information receiving part 331, the authentication part 332, the information transmission part 333, and the price determination part 334 by executing the program stored in the storage 32.

The information receiving part 331 receives a) a first apparatus ID for identifying an unmanned flight apparatus 1a, which is one of the plurality of unmanned flight apparatuses 1, and b) a first registered operator ID stored in the storage medium M1 attached to the unmanned flight apparatus 1a from the unmanned flight apparatus 1a in association with each other via the communication part 31. The information receiving part 331 may receive the first apparatus ID and the first registered operator ID in association with the instruction information received by the unmanned flight apparatus 1 from the operation apparatus 2. The information receiving part 331 notifies the authentication part 332 about the received information.

Further, the information receiving part 331 may receive, via the communication part 31, position information indicating a position at which the unmanned flight apparatus 1a is flying from the unmanned flight apparatus 1a. The information receiving part 331 notifies the price determination part 334 of the received position information.

The authentication part 332 authenticates the unmanned flight apparatus 1a on the basis of whether or not the first registered operator ID is stored in the storage 32 in association with the first apparatus ID received by the information receiving part 331. The authentication part 332 refers to, for example, the management database stored in the storage 32 to specify the operable range of the unmanned flight apparatus 1a that has transmitted the first registered operator ID. The authentication part 332 notifies the information transmission part 333 of the authentication result including the information indicating the specified range, and instructs the information transmission part 333 to transmit the authentication result to the unmanned flight apparatus 1a.

Specifically, the authentication part 332 instructs the information transmission part 333 to transmit the authentication result indicating that the instruction information received by the unmanned flight apparatus 1 is proper information to the unmanned flight apparatus 1a on the condition that the authentication information included in the instruction information received by the information receiving part 331 from the unmanned flight apparatus 1a is the same as or corresponds to the first registered operator ID.

The authentication part 332 may update the data in the management database. For example, the authentication part 332 manages the number of years that has elapsed since the apparatus ID and the operator ID were registered in the management database, and notifies the operator or the administrator of the unmanned flight apparatus 1 about update guidance information indicating that a license needs to be updated when the number of years elapsed reaches a predetermined number.

After a predetermined period of time has elapsed since the transmission of the update guidance information, the authentication part 332 deletes data associated with the apparatus ID of the unmanned flight apparatus 1 that has reached a predetermined number of years since registration, or data associated with the registered operator ID of the operator that has reached a predetermined number of years since registration. The authentication part 332 leaves the data associated with the apparatus ID or registered operator ID undeleted if update processing is performed within a predetermined period of time after the update guidance information has been transmitted. By having the authentication part 332 operating in this way, it is possible to prevent outdated unmanned flight apparatus 1 from continuing to be used, or the unmanned flight apparatus 1 from being operated by an operator who may not have sufficient operating skills.

On the basis of the notification received from the authentication part 332, the information transmission part 333 transmits, to the unmanned flight apparatus 1a, an authentication result indicating whether or not the first registered operator ID is stored in the storage 32 in association with the first apparatus ID received by the information receiving part 331. The information transmission part 333 may transmit the authentication result including the operation range information indicating the operable range specified by the authentication part 332 to the unmanned flight apparatus 1a.

The price determination part 334 determines a price for the operator to use the unmanned flight apparatus 1. The price determination part 334 determines a price for flying the unmanned flight apparatus 1 on the basis of, for example, the size of the operable range indicated by the operation range information. The price determination part 334 transmits the price to an external computer or the like in association with the registered operator ID via the communication part 31. The price determination part 334 transmits the registered operator ID and the price in association with each other to a server that creates billing information for the operator, for example.

The price determination part 334 can determine the price on the basis of various conditions. For example, the price determination part 334 determines the price on the basis of the positions where the unmanned flight apparatus 1 flew. In order to achieve this, the storage 32 stores a reference amount of the price corresponding to each of a plurality of areas in a space in which the unmanned flight apparatus 1 is allowed to fly, and the information receiving part 331 acquires position information indicating the position of the unmanned flight apparatus 1. The price determination part 334 determines the price corresponding to the unmanned flight apparatus 1a on the basis of the reference amount stored in the storage in association with the area including the position indicated by the position information.

In the storage 32, the price for the area above a tourist attraction is set higher than the price for the area above a non-tourist attraction, for example. By setting the price for each area in this way, it is possible to prevent the number of unmanned flight apparatuses 1 flying in the area where many people want to fly the unmanned flight apparatus 1 from increasing too much.

The price determination part 334 may determine the price on the basis of the distance the unmanned flight apparatus 1 flew. In order to achieve this, the storage 32 stores the flight distance and the reference amount of the price in association with each apparatus ID, and the information receiving part 331 obtains a plurality of pieces of position information indicating a plurality of positions where the unmanned flight apparatus 1 flew in association with each other. The price determination part 334 specifies the distance the unmanned flight apparatus 1 flew on the basis of the plurality of pieces of position information. Then, the price determination part 334 determines the price corresponding to the unmanned flight apparatus 1 on the basis of a) the determined flight distance of the unmanned flight apparatus 1 and b) the reference amount stored in the storage 32 in association with the apparatus ID of the unmanned flight apparatus 1. Due to the price determination part 334 determining the price on the basis of the flight distance in this way, it is possible to prevent the operator from flying the unmanned flight apparatus 1 longer than necessary.

Incidentally, it may be necessary to allow the unmanned flight apparatus 1 to be used for different prices by different operators. For example, it is reasonable to offer operators who have paid a higher base fee in advance a lower price for flying a particular area than those who have paid a lower base fee. Therefore, the storage 32 may store the reference amount of the price corresponding to each of the plurality of areas in the space in which the unmanned flight apparatus 1 is allowed to fly, in association with each of the plurality of registered operator IDs. The price determination part 334 may determine the price corresponding to the registered operator ID on the basis of a) the positions where the unmanned flight apparatus 1 flew and b) the reference amount stored in the storage 32 in association with the registered operator ID included in the instruction information transmitted to the unmanned flight apparatus 1 in order to fly the unmanned flight apparatus 1 among the plurality of registered operator IDs.

Figure 5:
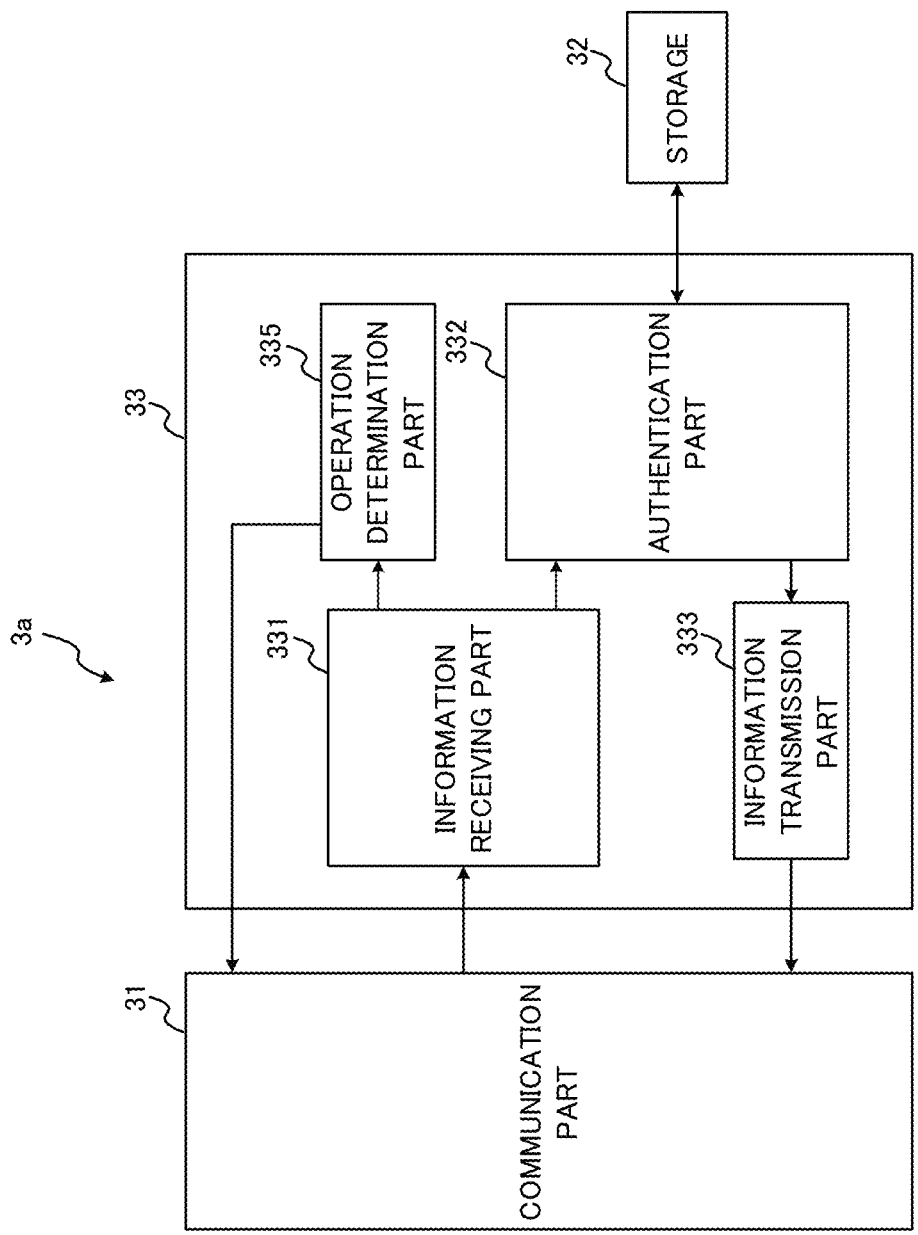
FIG. 5 is a diagram showing a configuration of a management apparatus 3a as another example of the management apparatus 3.

FIG. 5 is a diagram showing a configuration of a management apparatus 3a as another example of the management apparatus 3. The management apparatus 3a shown in FIG. 5 differs from the management apparatus 3 in that an operation determination part 335 is provided instead of the price determination part 334 in the management apparatus 3 shown in FIG. 3. The management apparatus 3a may include the operation determination part 335 together with the price determination part 334.

The operation determination part 335 determines whether or not content of the operation performed by the operator is proper. In order for the operation determination part 335 to determine whether or not the content of the operation is proper, the storage 32 of the management apparatus 3a stores a plurality of unauthorized flight patterns which are flight patterns of the unmanned flight apparatus 1 being in an unauthorized flight state. The unauthorized flight pattern is a flight pattern that flies the unmanned flight apparatus 1 at a dangerous speed or acceleration, or approaches a prohibited area.

The information receiving part 331 acquires a plurality of pieces of position information indicating a plurality of positions of the unmanned flight apparatus 1 in association with time. Then, if the flight pattern of the unmanned flight apparatus 1 specified on the basis of the plurality of position information acquired by the information receiving part 331 is similar to any one of the plurality of unauthorized flight patterns stored in the storage 32, the operation determination part 335 determines that the unmanned flight apparatus 1 is in the unauthorized flight state. In this case, the operation determination part 335 outputs, in association with the registered operator ID, information indicating that the unmanned flight apparatus 1 is in the unauthorized flight state.

The operation determination part 335 transmits information indicating that the unmanned flight apparatus 1 is in the unauthorized flight state to the computer of the administrator of the unmanned flight apparatus 1 via, for example, the communication part 31. By having the operation determination part 335 operating in this manner, it is possible to reduce a risk that the unmanned flight apparatus 1 is used in acts of terrorism. In addition, by having the operation determination part 335 operating in this way, the administrator of the unmanned flight apparatus 1 and the operators can recognize an operator who is performing an operation which is not permitted, prohibit the operator from operating the unmanned flight apparatus 1, and revoke the license given to the operator.

The operation determination part 335 may specify the operation skill of the operator by comparing the content of the operation performed by the operator with the content of the reference operation. The operation determination part 335 may transmit data indicating the specified operation skill to another computer in association with information for specifying the operator (for example, operator ID or name). The operation determination part 335 may output the operator, the type of the unmanned flight apparatus 1, and the operation skill in association with each other. By having the operation determination part 335 outputting these pieces of data, it is easier for people looking for someone to operate the unmanned flight apparatus 1 to find an appropriate operator.

Further, the operation determination part 335 may output the information for identifying the unmanned flight apparatus 1 (for example, apparatus ID), the information for identifying the operator, the time at which the operation has been performed, and the content of the operation in association with each other. In this case, the operation determination part 335 may output these pieces of information in a manner such that the unauthorized operation can be distinguished from other operations. By having the operation determination part 335 outputting such information, the administrator of the operator or the administrator of the unmanned flight apparatus 1 can easily investigate the situation when an unauthorized operation is performed.

The operation determination part 335 may search for the unmanned flight apparatus 1 and the operator that performed the unauthorized flight on the basis of the position and the time specified on the basis of the image information acquired via the information receiving part 331. The image information is, for example, an image of the unmanned flight apparatus 1 taken with a mobile terminal acquired from a victim who has been unjustly pursued by the unmanned flight apparatus 1, and includes information indicating a shooting location and a shooting time (for example, GPS information). Specifically, the operation determination part 335 identifies the unmanned flight apparatus 1 and the operator for which it is determined that the position and the time at which the unmanned flight apparatus 1 performed the unauthorized operation are equal to the shooting location and the shooting time indicated by the acquired image information. By having the operation determination part 335 operating in this manner, the operator who has performed the unauthorized operation can be identified early, such that the operator can be prevented from performing the unauthorized operation.

[Processing in a Flight Apparatus Management System S]

Figure 6:
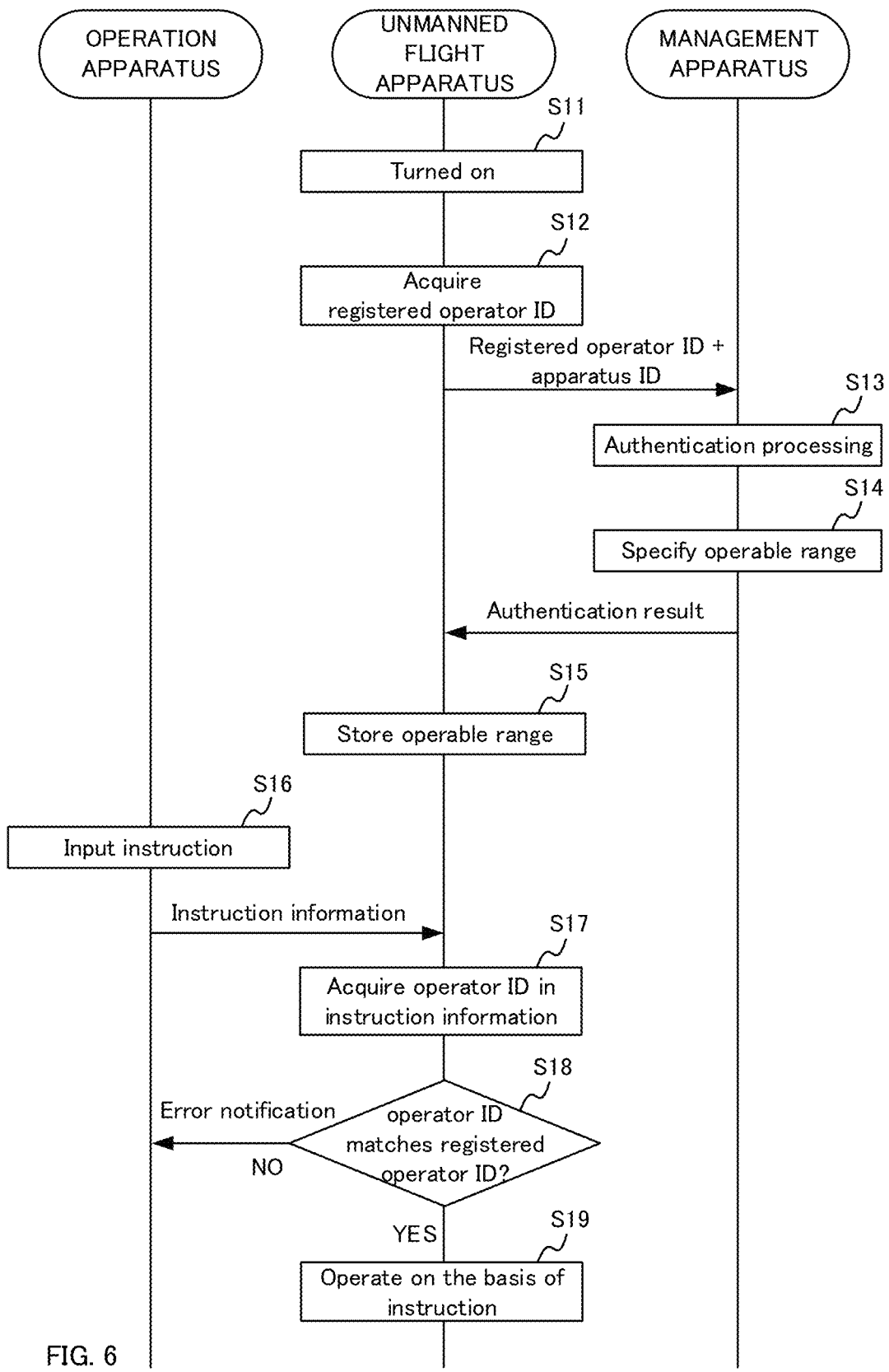
FIG. 6 is a sequence diagram showing an example of processing in the flight apparatus management system S.

FIG. 6 is a sequence diagram showing an example of processing in a flight apparatus management system S. The sequence diagram shown in FIG. 6 starts when the unmanned flight apparatus 1 is turned on (step S11). When the unmanned flight apparatus 1 is turned on, the authentication processing part 172 acquires the registered operator ID stored in the storage medium M1 (step S12). The authentication processing part 172 transmits the registered operator ID and the apparatus ID to the management apparatus 3 in association with each other to make an authentication request to the management apparatus 3.

In the management apparatus 3, when the information receiving part 331 receives the authentication request, the authentication part 332 performs the authentication processing (step S13). Specifically, the authentication part 332 specifies the operable range associated with the registered operator ID and the apparatus ID by referring to the management database stored in the storage 32 (step S14), and transmits the authentication result indicating the specified operable range to the unmanned flight apparatus 1. The authentication processing part 172 stores the information indicating the operable range indicated by the received authentication result in the storage 16 (step S15).

Thereafter, when the operator operates the operation apparatus 2, an instruction for operating the unmanned flight apparatus 1 is inputted to the operation apparatus 2 (step S16). The operation apparatus 2 transmits the instruction information corresponding to the operation content to the unmanned flight apparatus 1.

The authentication processing part 172 acquires the operator ID included in the instruction information received from the operation apparatus 2 (step S17), and determines whether or not the acquired operator ID matches the registered operator ID (step S18). If the authentication processing part 172 determines that the operator ID does not match the registered operator ID (NO in step S18), the authentication processing part 172 notifies the operation apparatus 2 that an error has occurred. If the authentication processing part 172 determines that the operator ID matches the registered operator ID (YES in step S18), the authentication processing part 172 instructs the flight controller 173 to operate the unmanned flight apparatus 1 on the basis of the instruction information received from the operation apparatus 2 (step S19).

Figure 7:
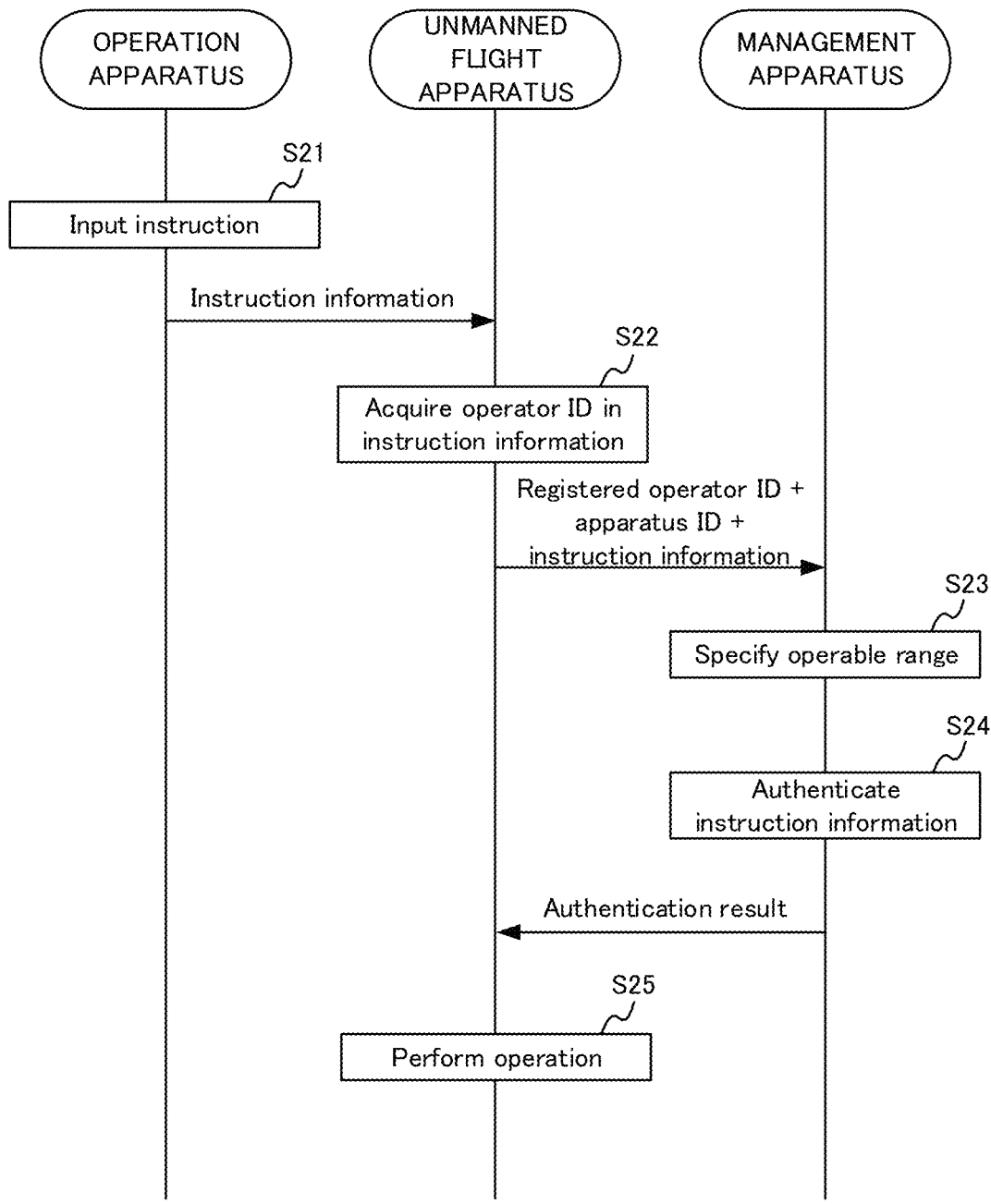
FIG. 7 is a sequence diagram showing a variation of processing in the flight apparatus management system S.

FIG. 7 is a sequence diagram showing a variation of the processing in the flight apparatus management system S. In the sequence diagram shown in FIG. 6, after the unmanned flight apparatus 1 is turned on, the authentication result indicating the operable range of the unmanned flight apparatus 1 is acquired from the management apparatus 3, and the information indicating the operable range indicated by the acquired authentication result is stored in the storage 16.

In contrast, the sequence diagram shown in FIG. 7 differs from the sequence diagram shown in FIG. 6 in that each time the unmanned flight apparatus 1 receives instruction information from the operation apparatus 2, the authentication processing part 172 transmits the instruction information to the management apparatus 3 in association with the operator ID and the apparatus ID acquired from the instruction information.

When the operator operates the operation apparatus 2, the instruction for operating the unmanned flight apparatus 1 is inputted to the operation apparatus 2 (step S21). The operation apparatus 2 transmits the instruction information corresponding to the operation content to the unmanned flight apparatus 1.

The authentication processing part 172 acquires the operator ID included in the instruction information received from the operation apparatus 2 (step S22). The unmanned flight apparatus 1 transmits the operator ID, the apparatus ID, and the instruction information to the management apparatus 3 in association with each other.

In the management apparatus 3, when the information receiving part 331 receives the operator ID, the apparatus ID, and the instruction information from the unmanned flight apparatus 1, the authentication part 332 specifies the operable range registered in the management database in association with the operator ID and the apparatus ID (step S23). Subsequently, the authentication part 332 authenticates the instruction information by determining whether or not the operation content indicated by the instruction information is included in the specified operable range (step S24), and transmits the authentication result to the unmanned flight apparatus 1.

The authentication processing part 172 controls the flight controller 173 on the basis of the authentication result received from the management apparatus 3 to operate the unmanned flight apparatus 1 (step S25). Specifically, if the authentication result indicates that the instruction information is proper, the authentication processing part 172 causes the flight controller 173 to perform the operation indicated by the instruction information. On the other hand, if the authentication result indicates that the instruction information is not proper, the authentication processing part 172 transmits an error notification to the operation apparatus 2 without causing the flight controller 173 to perform the operation indicated by the instruction information.

In this way, by having the authentication processing part 172 transmitting the instruction information together with the operator ID and the apparatus ID to the management apparatus 3 and receiving the authentication of the instruction information, the unmanned flight apparatus 1 can perform an appropriate operation even if the operable range changes over time due to external factors such as airspace congestion or weather conditions. It should be noted that, in order to suppress the influence of delay caused by transmitting the instruction information to the management apparatus 3 and obtaining the authentication result, the authentication processing part 172 may transmit the instruction information to the management apparatus 3 and receive the authentication on a condition that the instruction information for changing the operation of the unmanned flight apparatus 1 by a predetermined level or more is received.

[First Variation]

The above description illustrates that the registered operator ID is stored in the storage medium M1 attached to the storage medium attaching part 13 of the unmanned flight apparatus 1, but the unmanned flight apparatus 1 needs not have the storage medium attaching part 13 for attaching the storage medium M1. In this case, the registered operator ID is stored in an Electrically Erasable Programmable Read-Only Memory (EEPROM) of the storage 16, for example. The administrator of the unmanned flight apparatus 1 can write the registered operator ID in the EEPROM using a computer, for example.

[Second Variation]

The above description illustrates processing in which the authentication processing part 172 transmits the instruction information, the apparatus ID, and the registered operator ID received from the operation apparatus 2 to the management apparatus 3 in association with each other and the management apparatus 3 authenticates the instruction information, but the processing of authenticating the instruction information may be performed inside the unmanned flight apparatus 1. For example, the authentication processing part 172 may execute processing equivalent to the authentication processing performed by the management apparatus 3. That is, when the operator ID included in the instruction information matches the registered operator ID, the authentication processing part 172 may determine that the instruction information is proper.

[Third Variation]

The above description illustrates the maximum speed, the maximum acceleration, the maximum altitude, the allowed flight range, and the function that is allowed to be performed as the operable range stored in the storage 32, but the storage 32 may store specifications of the unmanned flight apparatus 1 (for example, the weight, the flyable distance, the use, and the like of the unmanned flight apparatus 1) that is allowed to be operated by the operator in association with the operator ID. In this case, the authentication part 332 permits the operation of the unmanned flight apparatus 1 on the condition that the specifications corresponding to the apparatus ID received from the unmanned flight apparatus 1 correspond to the specifications of the unmanned flight apparatus 1 operable by the operator stored in the storage 32 in association with the operator ID received from the unmanned flight apparatus 1.

[Effect of Flight Apparatus Management System S]

As described above, the unmanned flight apparatus 1 includes a) the authentication processing part 172 that authenticates that the instruction information is proper on the basis of the registered authentication information (for example, the registered operator ID) stored in the storage medium M1, and b) the flight controller 173 that flies the unmanned flight apparatus 1, on the basis of the instruction information, within the operable range determined by the relationship between the registered authentication information and the apparatus identification information (for example, the apparatus ID) under the condition that the authentication processing part 172 determines that the instruction information is proper. Due to the unmanned flight apparatus 1 having these configurations, the unmanned flight apparatus 1 performs an operation on the basis of an operation within a range authorized to the operator only when the instruction information is proper.

Therefore, the unmanned flight apparatus 1 does not perform an unauthorized operation due to the operator performing an operation that he/she is not authorized to perform (for example, an operation which cannot be performed with the operator's skill), nor does the unmanned flight apparatus 1 perform an unauthorized operation on the basis of false instruction information transmitted by an unauthorized third party for fraudulent purposes. As a result, the safety of the unmanned flight apparatus 1 can be improved.

The present invention is explained on the basis of the exemplary embodiments. The technical scope of the present invention is not limited to the scope explained in the above embodiments and it is possible to make various changes and modifications within the scope of the invention. For example, the specific embodiments of the distribution and integration of the apparatus are not limited to the above embodiments, all or part thereof, can be configured with any unit which is functionally or physically dispersed or integrated. Further, new exemplary embodiments generated by arbitrary combinations of them are included in the exemplary embodiments of the present invention. Further, effects of the new exemplary embodiments brought by the combinations also have the effects of the original exemplary embodiments.

What is claimed is:

1. An unmanned flight apparatus that flies on the basis of instruction information acquired from an operation apparatus, the unmanned flight apparatus comprising:
a storage that stores apparatus identification information for identifying the unmanned flight apparatus;
an instruction information acquisition part that acquires the instruction information;
an authentication processing part that authenticates that the instruction information is proper by comparing registered authentication information stored in a storage medium with biometric information of an operator transmitted periodically from an operation apparatus for operating the unmanned flight apparatus; and
a flight controller that flies the unmanned flight apparatus on the basis of the instruction information within an operable range defined by a relationship between the registered authentication information and the apparatus identification information, on a condition that the authentication processing part determines that the instruction information is proper, wherein
the authentication processing part determines a time interval with which the operation apparatus transmits the biometric information to the unmanned flight apparatus on the basis of a position where the unmanned flight apparatus is flying, and instructs the operation apparatus about the determined time interval, and
the authentication processing part shortens the time interval with which the operation apparatus transmits the biometric information when the unmanned flight apparatus is flying at a position where a first security level is assigned, as compared with a case where the unmanned flight apparatus is flying at a position where a second security level lower than the first security level is assigned.

2. The unmanned flight apparatus according to claim 1, further comprising:
a data collecting part that transmits data collected by the unmanned flight apparatus to a predetermined server while the biometric information received from the operation apparatus matches the registered authentication information or while the biometric information has a predetermined correlation with the registered authentication information, and does not transmit data collected by the unmanned flight apparatus to the server while the biometric information does not match the registered authentication information.

3. The unmanned flight apparatus according to claim 2, wherein
the data collecting part transmits the data to the server at a timing when the biometric information that matches the registered authentication information is received from the operation apparatus.

4. An unmanned flight apparatus that flies on the basis of instruction information acquired from an operation apparatus, the unmanned flight apparatus comprising:
a storage that stores apparatus identification information for identifying the unmanned flight apparatus;
an instruction information acquisition part that acquires the instruction information;
an authentication processing part that authenticates that the instruction information is proper by comparing registered authentication information stored in a storage medium with biometric information of an operator transmitted periodically from an operation apparatus for operating the unmanned flight apparatus; and
a flight controller that flies the unmanned flight apparatus on the basis of the instruction information within an operable range defined by a relationship between the registered authentication information and the apparatus identification information, on a condition that the authentication processing part determines that the instruction information is proper, wherein
the flight controller transmits a message to the operation apparatus when it is determined that the unmanned flight apparatus will reach a position not included in flight range information if the unmanned flight apparatus continues its flight based on the instruction information, the flight range information being included in an authentication result received from the authentication server in response to the authentication processing part transmitting the apparatus identification information and the registered authentication information to the authentication server in association with each other.

5. The unmanned flight apparatus according to claim 1, wherein
the flight controller transmits data indicating that an unauthorized instruction has been received to an external apparatus if the flight controller determines that the authentication information included in the instruction information acquired by the instruction information acquisition part is not the same as the registered authentication information.

6. An unmanned flight apparatus that flies on the basis of instruction information acquired from an operation apparatus, the unmanned flight apparatus comprising:
a storage that stores apparatus identification information for identifying the unmanned flight apparatus;
an instruction information acquisition part that acquires the instruction information;
an authentication processing part that authenticates that the instruction information is proper by comparing registered authentication information stored in a storage medium with biometric information of an operator transmitted periodically from an operation apparatus for operating the unmanned flight apparatus; and
a flight controller that flies the unmanned flight apparatus on the basis of the instruction information within an operable range defined by a relationship between the registered authentication information and the apparatus identification information, on a condition that the authentication processing part determines that the instruction information is proper, wherein
the flight controller transmits data indicating that an unauthorized instruction has been received to an external apparatus when the instruction information acquisition part acquires the instruction information for instructing an operation exceeding an operable range defined by the relationship between the registered authentication information and the apparatus identification information.

7. A management apparatus capable of communicating with a plurality of unmanned flight apparatuses, the management apparatus comprising:
a storage that stores a) a plurality of pieces of apparatus identification information for identifying the plurality of unmanned flight apparatuses and b) a plurality of pieces of registered authentication information associated with a plurality of operators or a plurality of operation apparatuses capable of operating at least any one of the plurality of unmanned flight apparatuses;

an information receiving part that receives, from the first unmanned flight apparatus, a) first apparatus identification information for identifying a first unmanned flight apparatus, which is one of the plurality of unmanned flight apparatuses, and b) instruction information including biometric information of an operator periodically received by the first unmanned flight apparatus from the operation apparatus in association with each other;

an authentication part that generates an authentication result indicating that the instruction information received by the first unmanned flight apparatus is proper information on a condition that the biometric information included in the instruction information is the same as first registered authentication information associated with the first unmanned flight apparatus corresponding to the first apparatus identification information among the plurality of registered authentication information; and an information transmission part that transmits the authentication result to the first unmanned flight apparatus, wherein the storage further stores operation range information indicating an operable range of the unmanned flight apparatus in association with each of the plurality of pieces of registered authentication information, the authentication part specifies a range in which the first unmanned flight apparatus that transmitted the first registered authentication information is allowed to operate by referring to the storage, and the information transmission part transmits the authentication result indicating the range specified by the authentication part to the first unmanned flight apparatus.

8. The management apparatus according to claim 7, further comprising:

a price determination part that determines a price for flying the unmanned flight apparatus on the basis of a size of the operable range indicated by the operation range information.

9. The management apparatus according to claim 8, wherein the storage stores a reference amount of the price corresponding to each of a plurality of areas in a space in which the unmanned flight apparatus is allowed to fly, the information receiving part acquires position information indicating a position of the first unmanned flight apparatus, and the price determination part determines the price corresponding to the first unmanned flight apparatus on the basis of the reference amount stored in the storage in association with the area including the position indicated by the position information.

10. The management apparatus according to claim 8, wherein the storage stores a flight distance and a reference amount of the price in association with each other for each piece of the apparatus identification information, the information receiving part obtains a plurality of pieces of position information indicating a plurality of positions where the first unmanned flight apparatus flew in association with each other, and the price determination part determines a distance the first unmanned flight apparatus flew on the basis of the plurality of pieces of position information, and determines the price corresponding to the first unmanned flight apparatus on the basis of the reference amount stored in the storage in association with the determined flight distance and the first apparatus identification information of the first unmanned flight apparatus.

11. The management apparatus according to claim 8, wherein the storage stores, in association with each of the plurality of pieces of registered authentication information, the reference amount of the price corresponding to each of a plurality of areas in the space in which the unmanned flight apparatus is allowed to fly, and the price determination part determines the price corresponding to the first registered authentication information on the basis of a) positions where the first unmanned flight apparatus flew and b) the reference amount stored in the storage in association with the first registered authentication information included in instruction information transmitted to the first unmanned flight apparatus in order to fly the first unmanned flight apparatus among the plurality of pieces of registered authentication information.

12. A management apparatus capable of communicating with a plurality of unmanned flight apparatuses, the management apparatus comprising:

a storage that stores a) a plurality of pieces of apparatus identification information for identifying the plurality of unmanned flight apparatuses and b) a plurality of pieces of registered authentication information associated with a plurality of operators or a plurality of operation apparatuses capable of operating at least any one of the plurality of unmanned flight apparatuses;

an information receiving part that receives, from the first unmanned flight apparatus, a) first apparatus identification information for identifying a first unmanned flight apparatus, which is one of the plurality of unmanned flight apparatuses, and b) instruction information including biometric information of an operator periodically received by the first unmanned flight apparatus from the operation apparatus in association with each other;

an authentication part that generates an authentication result indicating that the instruction information received by the first unmanned flight apparatus is proper information on a condition that the biometric information included in the instruction information is the same as first registered authentication information associated with the first unmanned flight apparatus corresponding to the first apparatus identification information among the plurality of registered authentication information; and an information transmission part that transmits the authentication result to the first unmanned flight apparatus, wherein the storage stores a plurality of unauthorized flight patterns which are flight patterns of the unmanned flight apparatus being in an unauthorized flight state, and the information receiving part may acquire a plurality of pieces of position information indicating a plurality of positions of the first unmanned flight apparatus in association with a time, the management apparatus further comprising:

an operation determination part that outputs, in association with the first registered authentication information, information indicating that the first unmanned flight apparatus is in the unauthorized flight state if a flight pattern of the first unmanned flight apparatus specified on the basis of the plurality of pieces of position information is similar to any one of the plurality of unauthorized flight patterns stored in the storage.

13. The management apparatus according to claim 12, wherein
the authentication part authenticates the first unmanned flight apparatus on the basis of whether or not the first registered authentication information is stored in the storage in association with the first apparatus identification information received by the information receiving part.

14. The management apparatus according to claim 7, wherein the authentication part authenticates the first unmanned flight apparatus on the basis of whether or not the first registered authentication information is stored in the storage in association with the first apparatus identification information received by the information receiving part.

* * * * *